United States Patent Office 3,840,680
Patented Oct. 8, 1974

3,840,680
CARBON DIOXIDE GENERATING FOODSTUFF PACKAGE WITH POLYETHYLENEIMINE LAYER COMPOSITE PLASTIC FOIL
Heinrich Gottlieb Schmidt, Wedel, Holstein, Dietrich Stoltzenberg, and Viktor Wolf, Hamburg, Germany, assignors to Lever Brothers Company, New York, N.Y.
No Drawing. Filed Mar. 28, 1972, Ser. No. 238,961
Claims priority, application Germany, Mar. 29, 1971, P 21 15 211.4
Int. Cl. B32b 9/04; B65b 55/00
U.S. Cl. 426—126                                    4 Claims

ABSTRACT OF THE DISCLOSURE

A composite plastic foil is described consisting of two layers, one of which is substantially gas-impermeable and the other of which is permeable to carbon dioxide, between which is an intermediate layer with carbon dioxide absorbing properties consisting essentially of polyethyleneimine of average molecular weight at least 3000 and in an amount from 0.2 to 10 g./m.$^2$ of the foil. The composite plastic foil is useful for packaging carbon dioxide releasing foodstuffs such as coffee, cheese and dough.

---

The present invention relates to a composite foil.

BACKGROUND OF THE INVENTION

As is known, many foodstuffs, such as roasted coffee, dough and post-ripening natural cheese, generate gaseous substances, particularly carbon dioxide, during storage under normal conditions. If such products are packed in flexible gas- and aroma-impermeable plastic foils, these soft packaging materials inflate if stored for several weeks. This is because the gaseous substances generated cannot escape through the gas-impermeable packing material. Inflated foodstuff packages are, however, undesirable as they can look unattractive and easily create the impression that the foodstuffs are no longer fresh or even that they are tainted, even when this is absolutely not the case, such as for example with post-ripening natural cheese or roasted coffee which generate carbon dioxide particularly when in fresh condition. It will be appreciated that the foil, or at least the surface in contact with the foodstuff, must not affect the foodstuff or deteriorate, as in general paper does, when in contact with foodstuffs such as cheese.

PRIOR PROPOSALS

It has already been attempted in various ways to obviate the disadvantage of the inflating of such packages, e.g. by using as packing material foils or combinations of foils which are permeable to carbon dioxide. It is true that such packages do not inflate and that they protect the packed goods from being soiled but they have great disadvantages. First they are aroma-permeable, secondly they are permeable to oxygen, and, since most foodstuffs are sensitive to oxygen the shelf life is considerably shortened.

Further there have been attempts to prevent the inflation by evacuating the aroma- and oxygen-impermeable packages after they have been filled and then closing them. But this measure too is in many cases either unsuitable, such as e.g. in the packing of sliced cheese when the separate slices are so tightly pressed against each other by the withdrawal of air that after the package is opened for consumption it is often quite difficult to separate them again, or not sufficiently effective because the quantity of carbon dioxide generated by the packed goods is so large that it releases the vacuum in the package and indeed often creates an over-pressure which causes the packages to inflate.

The advantages that would arise if roasted coffee could be packed in material that had the property of removing the carbon dioxide being generated by absorption have been mentioned in the past (Verpackungsrundschau 10, 1950, pages 73–80). The proposal did not suggest suitable packing materials that could be used to provide these advantages; the problem is stated, but not the solution. A composite foil has been prepared which, because of its content of alkali and alkaline earth aluminium silicates, so-called molecular sieves, has gas-absorbing properties. Apart from the fact that the strength of the packing material is diminished by mixing it with such substances, this embodiment also has the disadvantage that it is not suitable for transparent composite foils.

The aim of the present invention is to provide a packaging material and a packaging method for foodstuffs which generate carbon dioxide, such as e.g. post-ripening natural cheese, dough or freshly roasted coffee. The aim is to provide soft packages which safeguard the keeping qualities and are aroma-impermeable, without disadvantageous inflation of the packages occurring when they are stored.

THE INVENTION

As solution to this problem has been found a composite foil consisting of gas-impermeable foil, a foil permeable to carbon dioxide and an intermediate adhesive layer consisting essentially of polyethyleneimine with an average molecular weight greater than about 3,000 and a C:N ratio of 2 to about 2.7, in an amount of about 0.2 to about 10 g./m.$^2$ of the foil.

The invention therefore provides a composite plastic foil consisting of a gas-impermeable foil, a foil permeable to carbon dioxide and an intermediate adhesive layer consisting essentially of polyethyleneimine with an average molecular weight of at least about 3000 and a C:N ratio of about 2 to about 2.7, in an amount of 0.2 to about 10 g./m.$^2$ of the foil.

The invention also provides carbon dioxide generating foodstuffs packaged in such a composite foil and a method for their packaging.

Comparison with prior art on use of polyethyleneimine as adhesive

It has already been proposed to use polyethyleneimine for bonding composite foils. There are for example composite foils on the European market which consist of a saranized cellophane foil, a primer layer of polyethyleneimine and a polyethylene foil. Such foils have no noteworthy capacity for absorbing carbon dioxide, as the amounts of polyethyleneimine require for bonding the foils, about 0.02 to 0.05 g./m.$^2$, are far smaller than the amounts which are necessary for an appreciable absorption of carbon dioxide. Only the use of polyethyleneimine in amounts according to the invention of 0.2 to about 10 g./m.$^2$ of foil, preferably of about 0.3 to about 8 g./m.$^2$ of foil, which thus forms a multiple of the primer amounts normally used, leads to the desired result, preventing the inflation of the soft packages completely or to a considerable extent. It has proved that for a good capacity for absorbing carbon dioxide the coating amount of polyethyleneimine for thicker composite foils, e.g. of 100 to 200 $\mu$ thickness, which are suitable for the manufacture of fairly large bags and similar packages to hold about 1000 ml. and more, is closer to the uppermost limit indicated, whereas for thinner composite foils, e.g. of 30 to 50 $\mu$ thickness, which are used for smaller bags, amounts of polyethyleneimine lying closer to the lowest limit indicated are quite adequate. It has proved to be particularly favourable to manufacture packages to hold about 100 to 300 ml., for example bags for slices of hard cheese, from composite foils according to the invention with amounts of polyethyleneimine from approximately 0.5 to 3 g./m.$^2$ of foil. A useful lower limit is 1.5 g./m.$^2$. The molecular weight of the polyethyleneimine should not lie under about 3,000 as with lower molecular polyethyleneimines there is danger that the gas-permeable foil facing the contents will distort or twist. The upper limit of molecular weight can only be given very approximately and will be about 60,000 A convenient range of average molecular weight is 5,000 to 15,000. Important for the effectiveness of the polyethyleneimine is the degree of its basicity, which is the reason why the polyethyleneimine to be used should have a C:N ratio of at most 2.7, preferably about 2. Increasing the polyethyleneimine content in the composite foils to above the uppermost limit indicated, 10 g./m.$^2$ of foil, yields no additional advantage, that is to say no further important increase of the composite foil's capacity for absorbing carbon dioxide, but can on the contrary lead to technical difficulties during the handling of such composite foils.

Polyethyleneimine is preferably applied in a known manner as an aqueous or aqueous-alcoholic, for example 20%, solution having a pH of >9 to a foil of for example cellophane saranized on both sides. To this adhesive layer a foil which is permeable to carbon dioxide, e.g. a polycarbonate foil, is applied with the aid of known methods, e.g. by laminating or by extrusion coating.

Materials that are sufficiently gas-impermeable for the composite foils according to the invention are for example foils of polyvinylchloride, polyvinylidene chloride copolymerisates or combinations of foils such as materials provided on one or both sides with a layer of polyvinylidene chloride, for example saranized cellophane foils, and also foils of suitable metals, e.g. aluminum foils.

Materials permeable to carbon dioxide which are suitable for the composite foils according to the invention are for example foils of polyolefins, particularly polyethylene, and also of polycarbonates, or combinations of foils of polyester and polystyrol.

The composite foils according to the invention are characterized by an excellent capacity for absorbing carbon dioxide as well as very good aroma- and oxygen-impermeability, so that for goods which are sensitive to oxygen and/or generate carbon dioxide during storage they are especially suitable as packing material. Thus in soft packages made of the composite foils according to the invention, in which post-ripening natural cheese has been aroma-impermeably packed, no or only a negligible inflation is observed after storage for 8 weeks in an air-conditioned storage space at 20° C. and a relative humidity of 65%.

Another advantage of applying polyethyleneimine in amounts according to the invention is that the transparency and, if present, the colour of the plastic foils used are not impaired or, at worst, not too much.

The invention will be further illustrated with reference to the following examples, without, however, being limited to these examples.

EXAMPLE I

An approximately 20% aqueous solution of a polyethyleneimine with an average molecular weight of 9,400 and a C:N ratio of 2.06 and having a pH of approximately 11.5 was concentrated in a vacuum evaporator under nitrogen to a water content of 9% by weight. With a coating and laminating machine commonly used in the industry the concentrate was applied with the aid of a depositing roll to a cellophane foil provided on both sides with a layer of polyvinylidene chloride in an amount of 2 g. of polyethyleneimine per m.$^2$ of foil and then laminated with a 50μ thick high pressure polyethylene foil under a compression pressure of 7.7 kg./cm.$^2$.

100 g. slices of Emmental cheese were packed, under a protective gas mixture of 86% carbon dioxide and 14% nitrogen, in bags of the composite foil obtained and then closed by welding. During subsequent storage for 8 weeks at 20° C. and a relative humidity of 65% the change in the volume of the bags was measured at intervals of 2 weeks. To determine the volume of a bag, the bag containing the cheese slices is put each time in a polyethylene casing which is open at the top and welded at the bottom and which, when immersed in a container filled with water, tightly fits around the bag of cheese. The volume of the bag is determined from the volume of the displaced water which flows into a measuring jar and is then measured.

For the sake of comparison, each time with the same charges of 100 g. slices of Emmental cheese similar storage tests were carried out with bags manufactured from a previously proposed composite foil that built up like the composite foil according to the invention but only contained 0.02 g. of polyethyleneimine per m.$^2$ of foil.

The results, as averages of measurements with 140 bags, are compared in Table I.

TABLE I

[Storage of Emmental cheese slices in plastic bags made of polyethylene/polyethyleneimine/cellophane saranized on both sides. Volume of the bags at the beginning of storage approximately 180 ml.]

| No. | Kind of composite foil | Amount of polyethyleneimine (g./m.$^2$) | Change in volume (ml.) after— | | | |
|---|---|---|---|---|---|---|
| | | | 2 wks. | 4 wks. | 6 wks. | 8 wks. |
| 1 | Previous proposal | 0.02 | +19 | +48 | +106 | +183 |
| 2 | According to the invention. | 2 | −26 | −24 | −18 | −9 |

As Table I shows, after storage for 8 weeks the packages made from previously proposed composite foils (No. 1) were inflated on the average to approximately twice the starting volume, whereas the packages from composite foils according to the invention (No. 2) after storage for 8 weeks even showed a decrease, slight though it was, in the volume, whereby their appearance resembled that of shrunken packages.

EXAMPLE II 160 g. slices of firm Tilsit cheese were packed, under a protective gas atmosphere, in bags of a composite foil which, as in example 1, was manufactured from a cellophane foil saranized on both sides, 2 g. of polyethyleneimine per m.$^2$ of foil and a 50μ thick high pressure polyethylene foil. After careful sealing of the filled bags they were stored for 8 weeks at 20° C. During that time the changes in the volume of the bags were measured at intervals of 2 weeks. For the sake of comparison, each time with the same charges of 160 g. slices of firm Tilsit cheese, a similar storage test was carried out with bags manufactured from a previously proposed composite foil that is built up in approximately the same way as that according to the invention but only contains 0.02 g. of polyethyleneimine per m.$^2$ of foil as primer layer. The results, as averages of measurements with 140 bags in each case, are compared in Table II.

TABLE II

| No. | Kind of composite foil | Amount of polyethyleneimine (g./m.$^2$) | Change in volume (ml.) after— | | | |
|---|---|---|---|---|---|---|
| | | | 2 wks. | 4 wks. | 6 wks. | 8 wks. |
| 1 | Previous proposal | 0.02 | +30 | +83 | +184 | [1] +250 |
| 2 | According to the invention. | 2 | −6 | +12 | +20 | +46 |

[1] 70% of the bags split.

The packages made from the previously proposed composite foils (No. 1) were already abnormally inflated after 4 weeks, and after 8 weeks a great number of the bags even split as a result of the strong gas pressure within them. On the other hand the packages from composite foils according to the invention (No. 2) showed, even after storage for 8 weeks, only slight inflation, none of the packages had become porous or had split as a result of too great a pressure from within.

EXAMPLE III

In the same manner as in example I a composite foil was manufactured in which, however, instead of the high pressure polyethylene foil a 30μ thick polycarbonate foil was used and to which, instead of 2 g./m.², only 1 g./m.² of polyethyleneimine was applied.

In the bags of the composite foil thus obtained, 100 g. slices of Emmental cheese were aroma-impermeable sealed each time under nitrogen as protective gas and the filled bags were subsequently stored for 8 weeks at 20° C. and a relative humidity of 65%, whereby at the beginning of the storage and thereafter at intervals of 2 weeks the volume of the bags was determined.

For the sake of comparison, each time with the same charges of 100 g. slices of Emmental cheese, similar storage tests were carried out with bags from similarly manufactured composite foils containing, however, only 0.02 g. of polyethyleneimine per m.² of foil.

The results, as averages of measurement with 140 bags in each case, are given in Table III.

TABLE III

[Storage of Emmental cheese slices in plastic bags made of polycarbonate/polyethyleneimine/cellophane saranized on both sides. Volume of the bags at the beginning of storage approximately 250 ml.]

| No. | Kind of composite foil | Amount of polyethyleneimine (g./m.²) | Change in volume (ml.) after— | | | |
|---|---|---|---|---|---|---|
| | | | 2 wks. | 4 wks. | 6 wks. | 8 wks. |
| 1 | According to the invention. | 1 | −53 | −49 | −47 | −51 |
| 2 | Composite foil for comparison. | 0.02 | 0 | +14 | +35 | +57 |

What is claimed is:

1. An improved composite plastic foil containing a gas-impermeable layer, a layer permeable to carbon dioxide and an intermediate adhesive layer consisting essentially of polyethyleneimine with an average molecular weight of at least about 3000 and a C:N ratio of about 2 to about 2.7, wherein the improvement comprises an intermediate layer at which the amount of polyethyleneimine is from about 0.2 to about 10 g./m.² of the composite plastic foil.

2. The improved composite plastic foil defined in claim 1 wherein the intermediate layer of the polyethyleneimine is from about 0.3 to about 8 g./m.² of the composite plastic foil.

3. A carbon dioxide generating foodstuff packaged and sealed in a composite plastic foil as claimed in claim 1, the foil permeable to carbon dioxide being adjacent to the foodstuff.

4. A method of packaging a carbon dioxide generating foodstuff in which the foodstuff is wrapped and sealed in a composite plastic foil as claimed in claim 1, the foil permeable to carbon dioxide being placed adjacent to the foodstuff.

References Cited
UNITED STATES PATENTS

| | | |
|---|---|---|
| 3,473,957 | 10/1969 | Porrmann et al. __ 99—171 LP X |
| 3,423,212 | 1/1969 | Purcell et al. _____ 99—171 LP |
| 3,630,759 | 12/1971 | Rumberger _____ 99—171 PP X |
| 3,712,848 | 1/1973 | Casey et al. _____ 161—213 |
| 2,940,889 | 6/1960 | Justice _____ 161—182 X |

OTHER REFERENCES

Gerhardt et al., Modern Packaging, June 1948, p. 163-5.

GEORGE F. LESMES, Primary Examiner

P. C. IVES, Assistant Examiner

U.S. Cl. X.R.

161—213, 182; 260—2. EN; 426—415